Aug. 13, 1963 G. T. PAUL ET AL 3,100,836

ADD ONE ADDER

Filed Feb. 24, 1960 4 Sheets-Sheet 1

INVENTORS
GERARD T. PAUL &
OREST J. BEDRIJ

BY Geoffrey Knight
ATTORNEY

Aug. 13, 1963 G. T. PAUL ETAL 3,100,836

ADD ONE ADDER

Filed Feb. 24, 1960 4 Sheets-Sheet 3

Aug. 13, 1963 G. T. PAUL ETAL 3,100,836

ADD ONE ADDER

Filed Feb. 24, 1960 4 Sheets-Sheet 4

3,100,836

ADD ONE ADDER

Gerard T. Paul and Orest J. Bedrij, Poughkeepsie, N.Y., assignors to International Business Machines Corporation, New York, N.Y., a corporation of New York Filed Feb. 24, 1960, Ser. No. 10,615
5 Claims. (Cl. 235—175)

This invention relates to electronic computers and more particularly to an electronic mechanism for performing addition.

In the usual type of digital adder, the speed at which the addition is performed is limited by the time required for carry propagation. The digital positions of the sum are sequentially generated, starting with the lowest order position. The sum for each digital position is generated only after the previous (lower order) digital position has been summed and it has been determined if there is a carry between the digital positions.

Improved adders, such as the one shown in U.S. Patent 2,879,001, "High Speed Binary Adder Having Simultaneous Carry Generation," by A. Weinberger et al., achieve higher speeds by simultaneously generating a plurality of carries. As shown therein, each carry can be generated independent from any lower order carry. Hence, all the carries could theoretically be simultaneously generated.

However, limitations which are inherent in the physical components which are used prevent the construction of circuitry whereby all the carries are simultaneously generated. In the device shown in the above reference, a scheme is disclosed whereby the digital positions are divided into groups. First, the carries in the lowest digital order group are simultaneously generated. The carries in the second level group are next simultaneously generated dependent only upon the highest order carry in the first group and upon the operand digits in the second group. The third level group operates similarly, developing its own carries based solely upon the operand digits in the third groups and upon the carry from the highest digit position of the second level group. When applied to numbers with a large number of digits the speed of such systems remains limited, since the groups operate sequentially, each group generating the sum of its digital position only after carry generation in the next lower order group is complete.

In the invention shown herein, the augend and addend operands are subdivided into groups, each group thereby having a subaugend and subaddend. The subaugend and subaddend of the various groups are first simultaneously operated upon to produce two signals; a carry generate signal which indicates that during an addition of the particular subaugend and subaddend, the respective group of digits would generate a carry which would propagate out of the highest order digital position of the group, and a carry propagate signal which indicates whether or not a carry into the respective group of digital positions would propagate through the respective group of digital positions.

The subaugend and subaddend digits are further simultaneously operated upon to produce a provisional sum for each group; the provisional sums being generated under the assumption that there had been no carry into each group of digital positions.

A high speed carry network examines the carry generate and the carry propagate signals and produces carry input signals for the various groups.

Finally, "add one" adders of novel design add "one" to the appropriate provisional sums. Each add one adder is responsive to the carry input signal for its respective group.

The novel scheme shown herein adds numbers which have a large number of digits more quickly than those schemes known to the prior art. Furthermore, the circuitry of each group can be identical, and each logical circuit need not have a large number of inputs. In the embodiment shown herein, a high speed adder is shown wherein the logical circuits have no more than four inputs.

The object of this invention is to provide an improved adder circuit.

A further object is to provide a faster circuit for adding operands with a large number of digits.

A further object is to provide an adder circuit wherein the logical AND circuits have a limited number of inputs.

A further object is to provide a circuit adapted to modular packaging techniques.

The foregoing and other objects, features and advantages of the invention will be apparent from the following more particular description of a preferred embodiment of the invention, as illustrated in the accompanying drawings.

Figure 1:
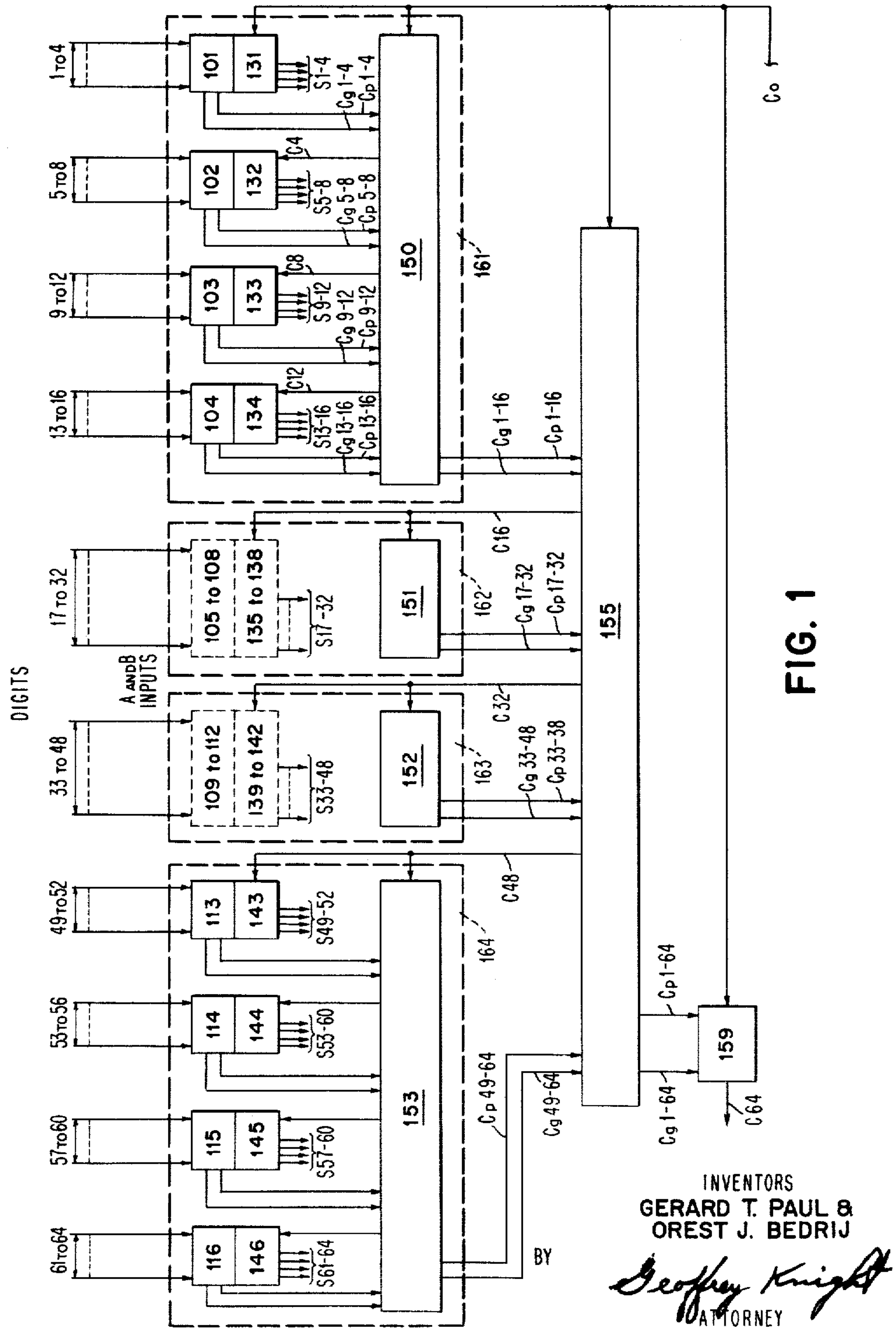
FIG. 1 is a block diagram showing the general organization of a preferred embodiment of this invention.

In the specific embodiment shown and described herein, the digits of the binary numbers to be summed, i.e. $A_{1-64}$ and $B_{1-64}$ are divided into a plurality of groups. Each group contains four digital positions (see FIG. 1).

The addition proceeds in three major steps. First, each of the circuits 101 to 116 operates on its respective A and B inputs to produce two carry functions; to wit, a carry generate funtcion, $C_g$, and a carry propagate function $C_p$. Circuits 101 to 116 also produce provisional sums which are respectively used as inputs for add one adder circuits 131 to 146. (The provisional sums will be explained in detail later.) It is important to note that each of the circuits 101 to 116 operates independently and simultaneously.

During the second step of the operation, the high speed carry network which consists of circuits 150, 151, 152, 153 and 155 examines the $C_g$ and $C_p$ functions and the end around carry $C_0$ and generates the group carry input signals C.

Thirdly, the add one adder circuits 131 to 146 operate to produce the sum digits $S_{1-64}$. Essentially circuits 131 to 146 "add one" to the respective outputs of circuits 101 to 116 if circuits 150 to 153 produce the respective C input signals.

The high speed carry network is broken into levels. In the specific embodiment shown herein (see FIG. 1) circuits 150, 151, 152 and 153 comprise the first level of the carry network, circuit 155 comprises the second level and circuit 159 is the third level carry network. The first level carry network produces carry propagate and carry generate signals which are used as inputs to the second level carry network. The second level carry network examines the carry generate and carry propagate signals produced by the first level networks, and it then produces carry input signals for the first level network. The end around carry $C_0$ operates as a carry input signal to the second level carry network. As will be seen in detail later, the carry networks do in some respects operate sequentially rather than simultaneously.

The specific embodiment shown herein will now be explained in detail. In the following description the four digit groups (e.g. digits 1 to 4, 5 to 8, etc.) will be referred to as minor digit groups, whereas the four groups comprising digits 1 to 16, 17 to 32, 33 to 48, and 49 to 64 will be referred to as major digit groups.

The major groups are numbered 161, 162, 163 and 164, respectively. It should be noted that FIG. 1 only shows the details of circuitry for major groups 161 and 164. As will be seen later the circuitry for groups 162 and 163 is identical to that shown for groups 161 and 164.

As is well known in the art, the carry C out of any digital position, *k* can be expressed as:

(*a*) $$C_k = A_k B_k + (A_k + B_k) C_{k-1}$$

(NOTE.—$+$ is herein used to represent the logical OR operation and $\veebar$ is used to represent the logical exclusive OR operation. As is customary, no symbol between letters represents the logical AND operation.) Herein the carry function is broken into two parts, i.e.

$$A_k B_k = \text{carry generate}$$
$$A_k + B_k = \text{carry propagate}$$

It can be seen that a carry generate signal indicates that a carry has been produced by the respective digital position, whereas a carry propagate signal indicates that a carry from a previous digital position would propagate through the respective digital position.

For the sake of clarity, it should be noted that since (*b*) $$A + B = (A \veebar B) + AB$$

the Equation *a* describing a carry function can be written (*c*) $$C_k = A_k B_k + (A_k \veebar B_k) C_{k-1} + A_k B_k C_{k-1}$$
(*d*) $$= A_k B_k + (A_k \veebar B_k) C_{k-1}$$

Hence, although the circuits 101 to 116 generate the function $A_k \veebar B_k$, in explaining the carry network herein, the function will be written $A_k + B_k$.

The following symbolic representations will be used through the specification:

*k* represents a specific digital position
*y* represent a specific digital position of lower order than *k*
$C_k$ represents a carry out of the *k* digital position
$C_{gk}$ represents a carry generated in the *k* digital position
$C_{g(k-y)}$ represents a carry generated in and propagated out of the group of digits *y* to *k*
$C_{p(k-y)}$ represents a condition wherein a carry introduced into the *y* digital position would propagate through the *k* digital position
$C_0$ represents an end around carry; *i.e.*, carry into the least significant digital position.

The embodiment shown herein contemplates the use of the type of AND, OR and Exclusive OR circuits shown and described in the copending application Serial No. 622,307, "Transistor Switching Circuits," filed November 15, 1956, now U.S. Patent 2,964,652. As will be explained in detail later, when the type of circuitry shown therein is used, a circuit called a convert block must be interposed betwen certain of the logical blocks. The convert blocks perform no logical operation and it is not necessary that they be considered in order to understand the invention. Hence, the invention will first be explained without reference to the convert blocks, and the function of the convert blocks will be explained later.

The symbology used on the drawings is as follows: A capital letter or symbol indicates the logical operation performed (i.e. A for AND; O for OR, $\veebar$ for Exclusive OR; and C for the convert block which performs no logical operation). The P and N subscripts and the $+$ and $-$ signs refer to the specific type of logical block used and a discussion of these symbols will be deferred until later. For the purpose of understanding the principle of the invention, the subscripts, the $+$ and $-$ signs, and the convert blocks may be ignored.

As is well known in the art, the carry out of the fourth digital position may be described by the following equation:

(*e*) $$C_4 = (A_4+B_4)(A_3+B_3)(A_2+B_2)(A_1+B_1)C_0 + (A_4+B_4)(A_3+B_3)(A_2+B_2)A_1B_1 + (A_4+B_4)(A_3+B_3)A_2B_2 + (A_4+B_4)A_3B_3 + A_4B_4$$

Breaking this equation into components it can be seen that the first series of terms (see below) represents a carry which is propagated through the fourth digital position from the zero order digital position, whereas the second series of terms represents a carry generated out of the fourth digital position. Hence, (*f*) $$C_{p1-4} = (A_4+B_4)(A_3+B_3)(A_2+B_2)(A_1+B_1)$$
(*g*) $$C_{g1-4} = (A_4+B_4)(A_3+B_3)(A_2+B_2)A_1B_1 + (A_4+B_4)(A_3+B_3)A_2B_2 + (A_4+B_4)A_3B_3 + A_4B_4$$

Therefore, the carry out of the fourth digital position could be written (*h*) $$C_4 = C_{p1-4}C_0 + C_{g1-4}$$

Likewise, as is well known in the art the carry out of the eighth digital position can be written (*i*) $$C_8 = (A_8+B_8)(A_7+B_7)(A_6+B_6)(A_5+B_5)C_4 + (A_8+B_8)(A_7+B_7)(A_6+B_6)A_5B_5 + (A_8+B_8)(A_7+B_7)A_6B_6 + (A_8+B_8)A_7B_7 + A_8B_8$$

Breaking this equation into components as was done before, we have (*j*) $$C_8 = C_{p5-8}C_4 + C_{g5-8}$$

If the carry $C_8$ were made dependent on the carry $C_4$, the carry $C_8$ would not be generated until the carry $C_4$ was generated. To avoid this delay the high speed carry generate network 150 generates the carry $C_8$ from the components of $C_4$, to wit, $C_{p1-4}$, $C_{g1-4}$, and $C_0$.

(*k*) $$C_8 = C_{p5-8}[C_{p1-4}C_0 + C_{g1-4}] + C_{g5-8}$$
(*l*) $$C_8 = C_{p5-8}C_{p1-4}C_0 + C_{p5-8}C_{g1-4} + C_{g5-8}$$

Likewise, (*m*) $$C_{12} = C_{p9-12}C_8 + C_{g9-12}$$
(*n*) $$C_{12} = C_{p9-12}C_{p5-8}C_{p1-4}C_0 + C_{p9-12}C_{p5-8}C_{g1-4} + C_{p9-12}C_{g5-8} + C_{g9-12}$$

Figure 2:
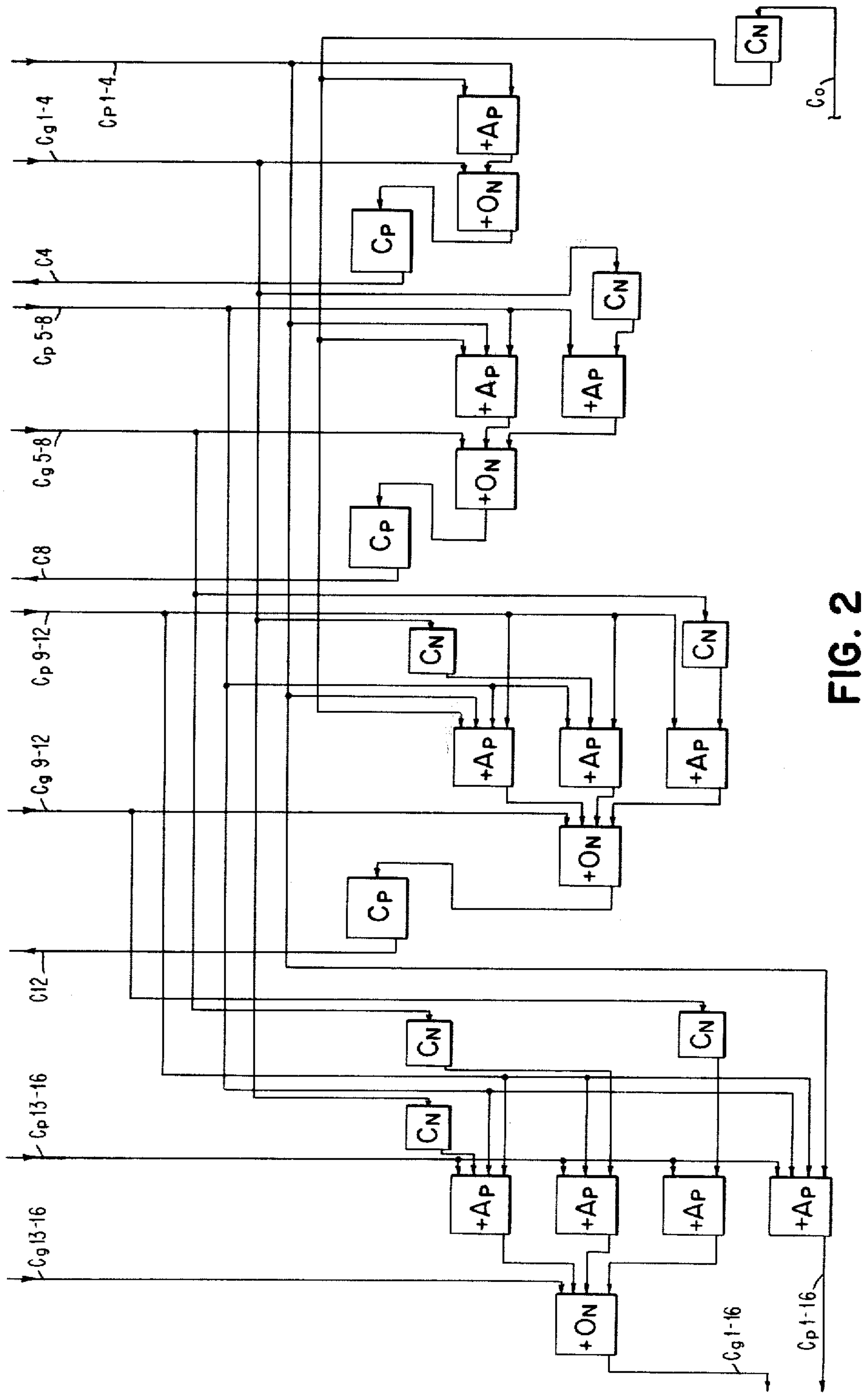
FIG. 2 is a schematic circuit diagram showing in detail one of the first level high speed carry propagate networks shown in FIG. 1.

The circuitry as defined by Equations *h*, *l* and *n* above, for the generation of the input carries $C_4$, $C_8$ and $C_{12}$ from the carry generate $C_g$, carry propagate $C_p$ and end around carry $C_0$ signals is shown in FIG. 2.

The carry out of the 16th digital position could be generated by the logical circuitry described by Equation *p* below.

(*o*) $$C_{16} = C_{p13-16}C_{12} + C_{g13-16}$$
(*p*) $$C_{16} = C_{p13-16}C_{p9-12}C_{p5-8}C_{p1-4}C_0 + C_{p13-16}C_{p9-12}C_{p5-8}C_{g1-4} + C_{p13-16}C_{p9-12}C_{g5-8} + C_{p13-16}C_{g9-12} + C_{g13-16}$$

However, it is seen that the first term of the Equation *p* above, would require an AND circuit with five inputs.

As previously stated, the AND circuits shown in this illustrative embodiment were limited to four inputs. This specific limitation was imposed to illustrate the type of requirement that may be satisfied by this invention. The circuitry shown herein could easily be altered to meet different circuit requirements without departing from the invention described herein.

However, since we are herein limited to four inputs, a second level of carry propagation was employed; namely, circuit 155. The number of levels of carry propagation needed depends upon the number of inputs that the logical blocks can accommodate, and the number of digital positions in the augend and addend.

The functions $C_{p1-16}$ and $C_{g1-16}$ are first generated by circuit 150 and then combined in circuit 155 with $C_0$ to form $C_{16}$. The circuitry of circuit 150 to produce $C_{p1-16}$ and $C_{g1-16}$ is defined by Equations *qa* and *qb* below. The circuitry in circuit 155 to produce $C_{16}$ is defined by the equation *r* below.

$$(qa)\quad C_{p1-16}=C_{p1-4}C_{p5-8}C_{p9-12}C_{p13-16}$$

$$(qb)\quad C_{g1-16}=C_{g13-16}+C_{p13-16}C_{g9-12}+C_{p9-12}C_{p13-16}C_{g5-8}+C_{p5-8}C_{p9-12}C_{p13-16}C_{g1-4}$$

$$(r)\quad C_{16}=C_{p1-16}C_0+C_{g1-16}$$

$C_{32}$ and $C_{48}$ are generated in the second level high speed carry network 155 by circuitry defined by Equations *sa* and *sb*.

$$C_{32}=C_{p17-32}C_{16}+C_{g17-32}$$

$$(sa)\quad C_{32}=C_{p1-16}C_{p17-32}C_0+C_{p17-32}C_{g1-16}+C_{g17-32}$$

$$C_{48}=C_{p33-48}C_{32}+C_{g33-48}$$

$$(sb)\quad C_{48}=C_{p1-16}C_{p17-32}C_{p33-48}C_0+C_{p17-32}C_{p33-48}C_{g1-16}+C_{p33-48}C_{g17-32}+C_{g33-48}$$

Figure 3:
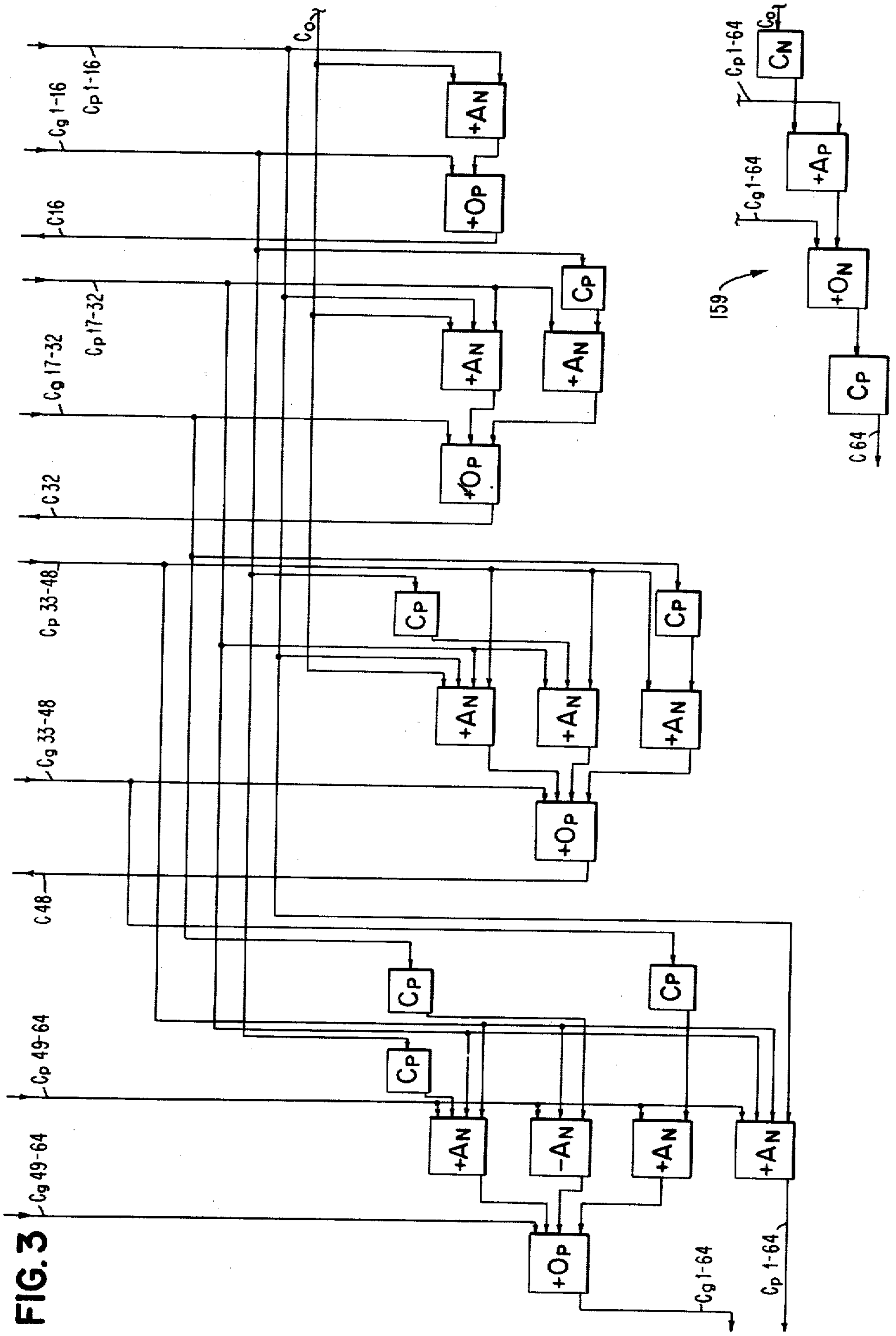
FIG. 3 is a schematic circuit diagram showing in detail the second and third level high speed carry propagate networks shown in FIG. 1.

From the above equations, it can be seen that the second level high speed carry propagate network 155 is identical in logical construction to the first level high speed networks 150, 151, 152, and 153. However, for completeness and for ease in understanding, the circuitry for the second level high speed network is shown and appropriately labeled in FIG. 3.

The carry out of the highest order digital position $C_{64}$ could be generated by the logical circuitry described by equation *u* below.

$$C_{64}=C_{p49-64}C_{48}+C_{g49-64}$$

$$(u)\quad C_{64}=C_{p1-16}C_{p17-32}C_{p33-48}C_{p49-64}C_0+C_{p17-32}C_{p33-48}C_{p49-64}C_{g1-16}+C_{p33-48}C_{p49-64}C_{g17-32}+C_{p49-64}C_{g33-48}+C_{g49-64}$$

However, the first term of Equation *u* above would require a five input AND circuit; hence, instead of generating $C_{64}$ in the second level carry network 155, another level of carry propagate network, i.e. circuit 159, is used to generate $C_{64}$.

The circuit 155 has logical circuitry to generate carry propagate and carry generate signals in accordance with Equations *ua* and *ub* below:

$$(ua)\quad C_{g1-64}=C_{g1-16}C_{p17-32}C_{p33-48}C_{p49-64}+C_{g17-32}C_{p33-48}C_{p49-64}+C_{g33-48}C_{p49-64}+C_{g49-64}$$

$$(ub)\quad C_{p1-64}=C_{p1-16}C_{p17-32}C_{p33-48}C_{p49-64}$$

Circuit 159 (FIG. 3) which comprises logical circuitry connected in accordance with equation *uc* below, responds to signals $C_{p1-64}$, $C_{g1-64}$ and $C_0$ and generates $C_{64}$.

$$(uc)\quad C_{64}=C_{g1-64}+C_0C_{p1-64}$$

The carries into the last three minor groups in each of the other major groups 162, 163 and 164 are generated in a manner similar to that previously described for generating carries $C_4$, $C_8$ and $C_{12}$ in major group 161. The equations describing circuits 151, 152 and 153 may be obtained by merely rewriting Equations *h*, *l*, and *n*, increasing the subscripts of each term by four for group 162, by eight for group 163, and by twelve for group 164.

Similar to circuit 150, circuits 151, 152 and 153 also produce carry generate and carry propagate signals. The equations defining these functions can be obtained by appropriately increasing the subscripts in Equations *q* and *r*.

Each of the circuits 101 to 116 is identical, and likewise, each of the add one adder circuits 131 to 146 is identical. Hence, only circuits 101 and add one adder circuit 131 will be explained in detail. Equations describing the logical circuitry of the other circuits may be obtained by appropriately increasing the subscripts of the various equations.

Circuit 101 (FIG. 4) includes the logical circuitry described by Equations *f* and *g* above to generate the carry generate and carry propagate functions. (NOTE: as previously described, that circuit 101 produces the $C_p$ and $C_g$ signals by using a plurality of Exclusive OR circuits rather than OR circuits.) Circuit 101 includes logical circuitry to generate a provisional sum from the subaugend which comprises the digits $A_1$, $A_2$, $A_3$ and $A_4$ and the subaddend which comprises the digits $B_1$, $B_2$, $B_3$ and $B_4$. The provisional sum assumes that there is no carry into the lowest order digital position of the group. The logical circuitry which generates the provisional sum digits $PS_1$ to $PS_4$ can be described by Equations *va*, *vb*, *vc* and *vd* below:

$$(va)\quad PS_1=A_1\veebar B_1$$

$$(vb)\quad PS_2=A_2\veebar B_2\veebar A_1B_1$$

$$(vc)\quad PS_3=A_3\veebar B_3\veebar[(A_2\veebar B_2)A_1B_1+A_2B_2]$$

$$(vd)\quad PS_4=A_4\veebar B_4\veebar\{A_3B_3+(A_3\veebar B_3)[A_2B_2+(A_2\veebar B_2)(A_1B_1)]\}$$

$$(ve)\quad =A_4\veebar B_4\veebar[(A_3\veebar B_3)(A_2\veebar B_2)(A_1B_1)+(A_3\veebar B_3)A_2B_2+A_3B_3]$$

Add one adder circuit 131 adds one to the provisional sum which consists of digits $PS_1$, $PS_2$, $PS_3$, $PS_4$ if the carry input signal $C_0$ is present. The final sum digits are designated as $S_1$, $S_2$, $S_3$ and $S_4$. The logical circuits in circuit 131 may be described by Equations *wa*, *wb*, *wc* and *wd* given below:

$$(wa)\quad S_1=PS_1\veebar C_0$$

$$(wb)\quad S_2=PS_2\veebar C_0PS_1$$

$$(wc)\quad S_3=PS_3\veebar C_0PS_1(A_2\veebar B_2)$$

$$(wd)\quad S_4=PS_4\veebar C_0PS_1(A_2\veebar B_2)(A_3\veebar B_3)$$

Figure 4:
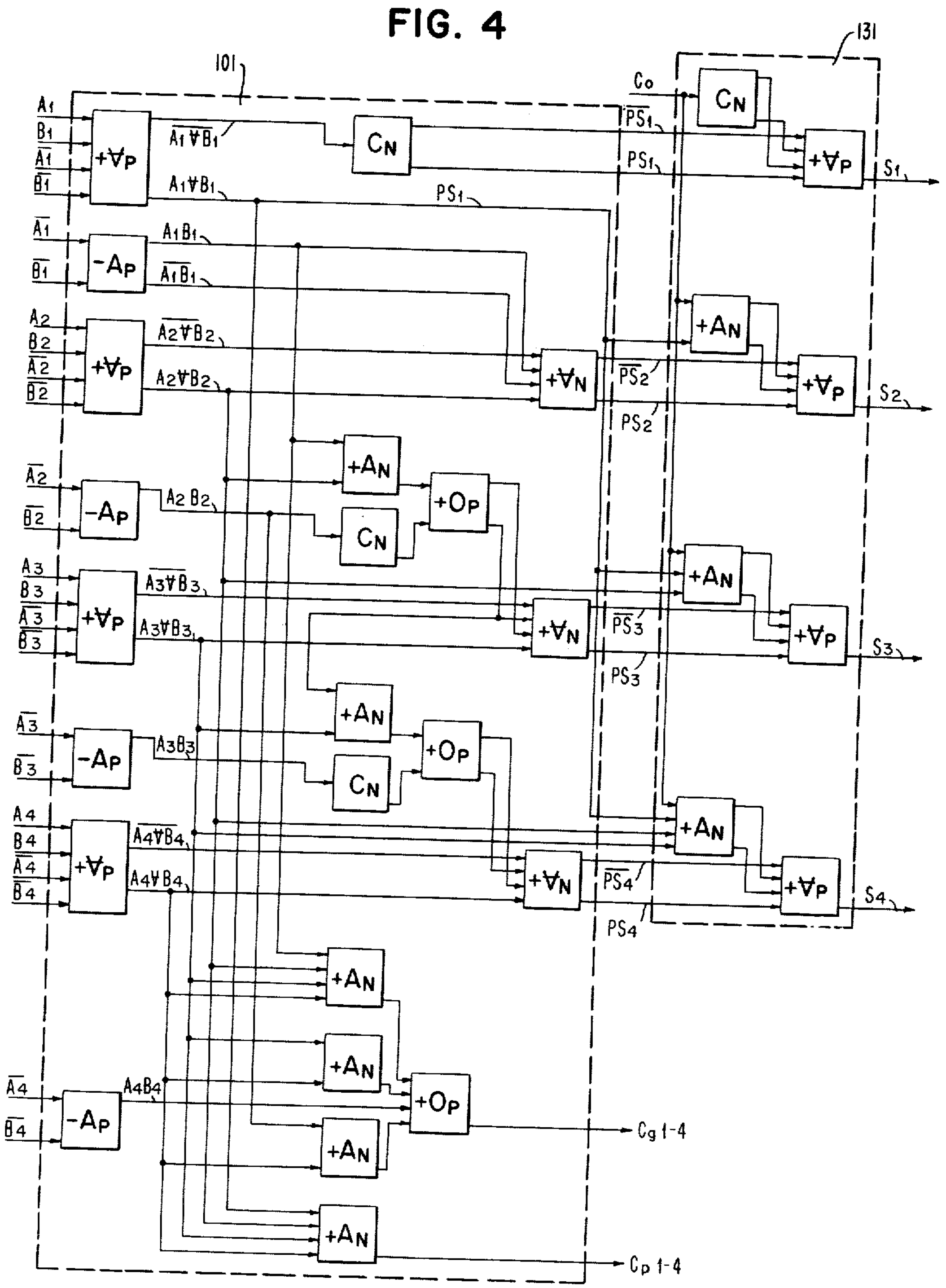
FIG. 4 is a schematic circuit diagram showing the organization of one of the minor digit groups shown in FIG. 1.

In understanding the above equations it should be noted that certain of the logical functions (for example, $A_2\veebar B_2$) appear in more than one of the equations (see Equations *vb* and *vc*). From the standpoint of speed (to which this patent application is primarily directed) the various signals could be generated separately; however, this would be unduly wasteful of circuit components. Hence, as shown in FIG. 4, the functions (for example, $A_2\veebar B_2$) are only generated once and thereafter they are used to generate a plurality of signals.

As previously stated, the embodiment of the invention shown herein contemplates that the type of logical blocks shown in the copending United States patent application Serial No. 622,307, filed November 15, 1956, and entitled "Transistor Switching Circuits," will be used. As shown in detail in the above referenced copending application, all the functions can be performed by three different transistor circuits. These can be described as an N block, a P block, and a convert block.

The N and P blocks each have one or more inputs and two outputs. The N block comprises a plurality of PNP transistors and the P block comprises a plurality of NPN transistors. For convenience the outputs may be designated as the top and bottom outputs, since in the drawings one output is always shown coming from the top of the output side of the box which represents the circuit, and the other output is always shown coming from the bottom of the output side of the box which represents the circuit.

In the following discussion, reference will be made to two different voltage reference levels. The first reference level called the N reference is ground potential, and lines wherein the voltage varies about this reference are called N lines. The second reference, called the P reference, is a certain negative voltage level, and lines varying about this reference are called P lines.

The various signal levels are referred to as +N, −N, +P or −P meaning respectively more positive or more negative than the respective references. The N blocks always have inputs which vary about the N reference and P blocks always have inputs which vary about the P reference. The output of a P block always varies about the N level and the output of an N block always varies about the P level.

Since it is sometimes desirable to have two N or two P blocks connected in succession, convert blocks are used to convert from an N level to a P level and vice versa. These blocks are designated as a $C_N$ block for converting from an N level to a P level and as a $C_P$ block for converting from a P level to an N level.

The operation of the N and P blocks is best shown by the following table:

N BLOCK

| One or more of the inputs | All of the inputs | Top output | Bottom output |
|---|---|---|---|
| −N | +N | +P<br>−P | −P<br>+P |

P BLOCK

| | | | |
|---|---|---|---|
| +P | −P | −N<br>+N | +N<br>−N |

In the drawings an N or a P subscript on a logic block indicates which type of logical block was used in the specific embodiment shown herein. The plus or minus sign indicates whether the block shown performs the logical operation when the input signals are positive or negative.

From the table shown above it can be seen that the N block can be used to perform either the positive AND, or negative OR, logical operation and that the P block can be used to perform either the negative AND, or positive OR, operation. Furthermore, by combining two or more blocks one can obtain the positive or negative exclusive OR functions.

The meaning, with reference to the blocks used, of the positive and negative AND and OR functions is shown by the table below:

| Function | All inputs | One or more inputs | Bottom output |
|---|---|---|---|
| −A | − | | − |
| +A | + | | + |
| −O | | − | − |
| +O | | + | + |

It should be noted, however, that the invention disclosed herein is not limited to the specific type of logical circuits shown. Those skilled in the art could implement this invention with any of the well known types of logical circuits.

It should also be noted that the circuits 101 and 131 could be analyzed by examining each digital position separately. If this were done, it would be seen that both in circuit 101 and in circuit 131, carries propagate between the various digital positions within the group.

While the invention has been particularly shown and described with reference to a preferred embodiment thereof, it will be understood by those skilled in the art that various changes in form and details may be made therein without departing from the spirit and scope of the invention.

We claim:

1. An adder wherein the digital positions of the augend, addend and sum are similarly divided into a plurality of groups, thereby forming a plurality of subaugends, subaddends, and true subsums, comprising in combination; digital input means in each respective group for supplying signals coded to represent the respective subaugended and subaddend; carry propagate means in each respective group, responsive to the respective digit input means for producing a carry propagate signal when the subaugend and subaddend values are such that during their addition a carry into the least significant digital positions of the respective group would propagate through the entire respective group of digital positions, carry generate means in each respective group responsive to the digit input means for producing a carry generate signal when the respective subaugend and subaddend values are such that during their addition a carry would propagate out of the respective group of digital positions irrespective of whether there was a carry into the respective group, summing means in each respective group responsive to said digital input means for generating output signals representing a provisional subsum of the subaugend and subaddend of the respective group, carry input means associated with each group responsive to the carry generate and carry propagate means of groups of lower digital order for producing a carry input signal for each group, and add one adder means in each group responsive to the respective group's summing means and to the carry input means for producing signals coded to represent the true subsum of the respective group.

2. An adder wherein the digital positions of the augend, addend and sum are successively subdivided a plurality of times thereby forming groups within groups in a plurality of size levels, the groups of all but the lowest size level having a relationship of higher level in respect to groups of next lower level, each group of digital positions thereby having a subaugend, a subaddend, and true subsum, comprising in combination; digital input means in each of the lowest level groups for supplying signals coded to represent the respective subaugend and subaddend, carry input means for the least significant digital position of each of said lowest level groups, carry propagate means in each of said lowest level groups, responsive to the respective digit input means for producing a carry propagate signal when the subaugend and subaddend values are such that during their addition a carry into the carry input means of the least significant digital position of said lowest level group would propagate through the entire respective group of digital positions, carry generate means in each of said lowest level groups, responsive to the respective digit input means for producing a carry generate signal when the respective subaugend and subaddend values are such that during their addition a carry would propagate out of the respective group of digital positions irrespective of whether there was a carry into the respective group, higher level group carry propagate means within each higher level group adapted to be rendered operative when each lower level group within said higher level group produces a carry propagate signal, higher level group carry generate means within each higher level group adapted to be rendered operative in response to any of the following conditions:

(1) a carry generate signal from the lowest order, lower level group within said higher level group plus a carry propagate signal from each next higher order group of said lower level groups, (2) a carry generate signal from the next to lowest order group of said lower level groups plus a carry propagate signal from each next higher order group of said lower level groups, (3) a carry generate signal from the next to highest order group of said lower level groups plus a carry propagate signal from the highest order group of said lower level groups, or (4) a carry generate signal from the highest order group of said lower level groups, group carry input means within each higher level group for supplying carry signals to (1) the least significant position of the lowest order group within the next higher order group of said higher level groups, (2) the group carry propagate means of the next higher order, higher level group, and (3) the group carry generate means of the next higher order, higher level group, said group carry input means adapted to be rendered operative in response to any of the following conditions:

(1) a carry generate signal from the carry generate means within said higher level group, or (2) a carry propagate signal from the carry propagate means within said higher level group plus a carry signal from the next lower order group of said higher level groups, summing means in each of the smallest groups responsive to said digital input means for generating signals representing a provisional subsum of the respective subaugend and subaddend, said means respectively responsive to the respective subaugend input means and to the respective subaddend input means, and add one adder means in each of the smallest groups, responsive to the summing means and to the respective group carry input means for producing signals coded to represent the true subsums of the respective groups.

3. The invention of claim 1 in which said carry propagate means comprises a logical circuit complex which provides an output $C_{px\ to\ x+3}$ in response to subaugend input signals $A_x$, $A_{x+1}$, $A_{x+2}$, and $A_{x+3}$ and to subaddend input signals $B_x$, $B_{x+1}$, $B_{x+2}$, and $B_{x+3}$ in accordance with the following Boolean equation:

$$C_{px\ to\ x+3}=(A_x \veebar B_x)(A_{x+1} \veebar B_{x1})(A_{x+2} \veebar B_{x+2})(A_{x3} \veebar B_{x+3})$$

wherein $x$ is the lowest order digital position within each of said groups in claim 1.

4. The invention of claim 1 in which said carry generate means comprises a logical circuit complex which provides an output $C_{gx\ to\ x+3}$ in response to subaugend input signals $A_x$, $A_{x+1}$, $A_{x+2}$, and $A_{x+3}$ and to the subaddend input signals $B_x$, $B_{x+1}$, $B_{x+2}$, and $B_{x+3}$ in accordance with the following Boolean equation:

$$C_{gx\ to\ x+3}=(A_{x+3} \veebar B_{x+3})(A_{x+2} \veebar B_{x+2})(A_{x1+} \veebar B_{x+1})A_xB_x+(A_{x+3} \veebar B_{x+3})(A_{x+2} \veebar B_{x+2})A_{x+1}B_{x+1}+(A_{x+3} \veebar B_{x+3})A_{x+2}B_{x+2}+A_{x+3}B_{x+3}$$

wherein $x$ is the lowest order digital position within each said group in claim 1.

5. The invention of claim 1 in which said add one adder comprises a logical circuit complex which produces outputs $S_x$, $S_{x+1}$, $S_{x+2}$, and $S_{x+3}$ in response to the outputs of said summing means $PS_x$, $PS_{x+1}$, $PS_{x+2}$, and $PS_{x+3}$ and to the carry input $C_{x-1}$ in accordance with the following Boolean Equations $a$, $b$, $c$ and $d$:

(a) $$S_x=PS_x \veebar C_{x-1}$$

(b) $$S_{x+1}=PS_{x+1} \veebar PS_xC_{x-1}$$

(c) $$S_{x+2}=PS_{x+2} \veebar (A_{x+1} \veebar B_{x+1})PS_xC_{x-1}$$

(d) $$S_{x+3}=PS_{x+3} \veebar (A_{x+2} \veebar B_{x+2})(A_{x+1} \veebar B_{x+1}PS_xC_{x-1})$$

wherein $x$ is the lowest order digital position within each said group in claim 1.

References Cited in the file of this patent

UNITED STATES PATENTS 2,879,001 Weinberger ------------ Mar. 24, 1959

OTHER REFERENCES

Proc. Institute of Elect. Engr. (England), Transistor Logic Using Current Switching, by Morgan et al., vol. 106, No. 29, pages 467–469, September 1959 (note particularly FIG. 2).

UNITED STATES PATENT OFFICE
CERTIFICATE OF CORRECTION

Patent No. 3,100,836 August 13, 1963

Gerard T. Paul et al.

It is hereby certified that error appears in the above numbered patent requiring correction and that the said Letters Patent should read as corrected below.

Column 3, line 39, for "through" read -- throughout --; line 41, for "represent" read -- represents --; line 59, for "betwen" read -- between --; column 9, line 25, for "$(A_{x+1} \vee B_{x1})$" read -- $(A_{x+1} \vee B_{x+1})$ --; line 26, for "$(A_{x3} \vee B_{x+3})$" read -- $(A_{x+3} \vee B_{x+3})$ --; column 10, line 3, for "$(A_{x1+} \vee B_{x+1})$" read -- $(A_{x+1} \vee B_{x+1})$ --; line 21, for "$(A_{x+1} \vee B_{x+1} PS_x C_{x-1})$" read -- $(A_{x+1} \vee B_{x+1}) PS_x C_{x-1}$ --.

Signed and sealed this 5th day of May 1964.

(SEAL)
Attest:

ERNEST W. SWIDER
Attesting Officer

EDWARD J. BRENNER
Commissioner of Patents